(12) United States Patent
Dunton

(10) Patent No.: US 8,873,935 B2
(45) Date of Patent: Oct. 28, 2014

(54) SYSTEM AND METHOD FOR AUTOMATICALLY CAPTURING USER EDITS IN A DIGITAL RECORDING

(75) Inventor: Randy R. Dunton, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 990 days.

(21) Appl. No.: 12/399,191

(22) Filed: Mar. 6, 2009

(65) Prior Publication Data

US 2009/0169170 A1 Jul. 2, 2009

Related U.S. Application Data

(63) Continuation of application No. 10/777,504, filed on Feb. 11, 2004, now Pat. No. 7,512,313.

(51) Int. Cl.
| | |
|---|---|
| *G11B 27/00* | (2006.01) |
| *H04N 21/433* | (2011.01) |
| *H04N 21/81* | (2011.01) |
| *G11B 27/034* | (2006.01) |
| *H04N 5/782* | (2006.01) |
| *H04N 21/4147* | (2011.01) |
| *H04N 21/854* | (2011.01) |
| *H04N 5/76* | (2006.01) |

(52) U.S. Cl.
CPC ....... *H04N 21/4147* (2013.01); *H04N 21/4334* (2013.01); *H04N 21/812* (2013.01); *G11B 27/034* (2013.01); *H04N 5/782* (2013.01); *H04N 21/854* (2013.01); *H04N 5/76* (2013.01); *G11B 2220/20* (2013.01)
USPC ........... 386/278; 386/239; 386/241; 715/723; 360/13; 369/47.13; 369/83

(58) Field of Classification Search
CPC .. G11B 27/034; G11B 2220/90; G11B 27/34; H04N 21/4147; H04N 5/76; H04N 5/782
USPC ......... 386/239, 241, 248–251, 278, 280–288; 369/47.13, 83; 715/723; 360/13
See application file for complete search history.

(56) References Cited

U.S. PATENT DOCUMENTS

| | | | |
|---|---|---|---|
| 6,236,801 B1 * | 5/2001 | Engle et al. .................... | 386/282 |
| 6,289,165 B1 * | 9/2001 | Abecassis ..................... | 386/224 |
| 6,707,778 B1 * | 3/2004 | Lin et al. ......................... | 369/83 |
| 6,965,723 B1 * | 11/2005 | Abe et al. ....................... | 386/281 |
| 7,055,166 B1 * | 5/2006 | Logan et al. ..................... | 725/32 |
| 2002/0133486 A1 * | 9/2002 | Yanagihara et al. ............. | 707/3 |
| 2004/0126085 A1 * | 7/2004 | Braun et al. .................... | 386/46 |
| 2006/0110128 A1 * | 5/2006 | Dunton et al. .................. | 386/52 |
| 2008/0050095 A1 * | 2/2008 | Okada et al. .................... | 386/98 |

* cited by examiner

*Primary Examiner* — Hung Dang
*Assistant Examiner* — Mishawn Dunn
(74) *Attorney, Agent, or Firm* — Garrett IP, LLC

(57) ABSTRACT

A method and system for automatically capturing user edits in a digital recording are described. The method involves determining a beginning time stamp for an edit segment in a digital recording and an ending time stamp for the edit segment in the digital recording. The method then receives an indication from a user whether to modify the edit segment for subsequent viewing of the digital recording.

20 Claims, 4 Drawing Sheets

SYSTEM AND METHOD FOR AUTOMATICALLY CAPTURING USER EDITS IN A DIGITAL RECORDING

The present patent application is a Continuation of application Ser. No. 10/777,504, filed Feb. 11, 2004 now U.S. Pat. No. 7,512,313.

BACKGROUND

The convergence of the television receiver and the personal computer has accelerated with the advent of the set-top computer systems. These systems, sometimes called set-top boxes, use a conventional analog or digital television receiver as a display for computer systems. In some cases, the set-top box sits on top of the television receiver. By combining the capabilities of a computer system and a television, the system may provide advanced television programming features, such as an electronic programming guide.

The set-top box may include personal video recorder (PVR) functionality. PVR is a generic term for a device that is similar to a video cassette recorder (VCR) but records television data in digital format as opposed to the VCR's analog format. A PVR allows a user to record a broadcasted program for later viewing. Unfortunately, the recorded broadcasted program includes the entire program of the original broadcast, including segments that a particular user may find undesirable. Undesirable segments may include commercials broadcasted with the program, repeated recaps of the program after commerical breaks that help the user who just tuned in to get a quick overview of the program, segments of the program that the user may not want small children to view, half time shows of sporting events, and so forth.

BRIEF DESCRIPTION OF THE DRAWINGS

The invention may be best understood by referring to the following description and accompanying drawings that are used to illustrate embodiments of the invention. In the drawings.

DESCRIPTION OF EMBODIMENTS

Figure 1:
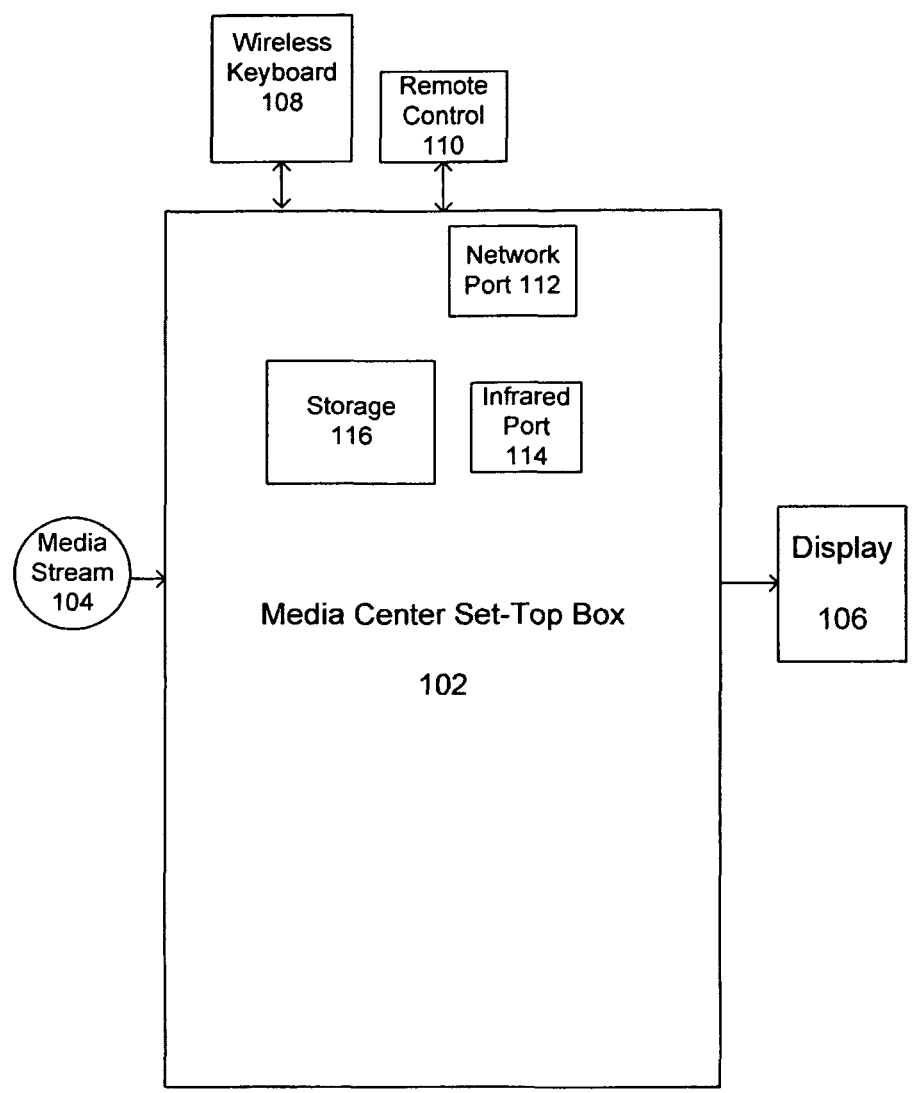
FIG. 1 illustrates one embodiment of an entertainment system environment in which some embodiments of the present invention may operate.

A method and system for automatically capturing user edits in a digital recording are described. A recorded broadcasted program generally includes both desirable and undesirable segments. Desirable segments include the parts of the program that the user wants to view. Undesirable segments include the parts of the program that the user does not want to view. Undesirable segments may include, but are not limited to, commercials, repeated recaps of the program, parts of the program the user deems unsuitable for his or her children, half time shows of sporting events, and so forth. Embodiments of the invention automatically capture user edits while the user is viewing a recorded broadcasted program (i.e., a digital recording). The invention then utilizes these captured user edits to identify undesirable segments in the digital recording. The present invention then allows the user to determine whether to delete or skip over the undesirable segments for subsequent viewing of the digital recording. Note that the present invention is not limited to recorded broadcasted programs, but applies also to any digital recording such as home digital recordings of family events. In the following description, for purposes of explanation, numerous specific details are set forth. It will be apparent, however, to one skilled in the art that embodiments of the invention can be practiced without these specific details.

Embodiments of the present invention may be implemented in software, firmware, hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer). These mechanisms include, but are not limited to, a hard disk, floppy diskettes, optical disks, Compact Disc, Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Some portions of the detailed descriptions that follow are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

FIG. 1 illustrates one embodiment of an entertainment system environment in which some embodiments of the present invention may operate. FIG. 1 shows an entertainment system with a wide range of installed equipment. This equipment is shown as examples of many of the possibilities. The entertainment system as shown in FIG. 1 may be used in a much simpler or still more complex system. The entertainment center as described in FIG. 1 is able to support communication through wide area network (WAN) and local area network (LAN) connections, Bluetooth, Institute of Electrical and Electronics Engineers (IEEE) 802.11, universal serial bus (USB), 1394, intelligent drive electronics (IDE), peripheral component interconnect (PCI) and infrared. Other interfaces may be added or substituted for those described as new interfaces are developed and according to the particular application. The specific devices shown in FIG. 1 represent one example of a configuration that may be suitable for a consumer home entertainment system and is not meant to limit the invention.

Referring to FIG. 1, the entertainment system includes, but is not necessarily limited to, a media center set-top box 102, a media stream 104, a display 106, a wireless keyboard 108 and a remote control 110. Media center set-top box 102 further includes a network port 112, storage 116 (non-removable or removable) and an infrared port 114. Although one media stream is shown in FIG. 1, it is understood that any number of media streams may be present. Each of these components is described in more detail next.

In one embodiment of the present invention, media center set-top box 102 includes personal video recorder (PVR) functionality. PVR is a generic term for a device that is similar to a video cassette recorder (VCR) but records television data in digital format as opposed to the VCR's analog format. VCRs utilize analog tapes to record and play programs broadcast over television, but PVRs encode video data in MPEG-1 or MPEG-2 formats and store the data in a hard drive. In the case of digital media streams, the PVR routes the previously encoded digital media stream to local storage. PVRs may encode other types of data and other types of data may be added or substituted for those described as new types of data are developed and according to the particular application for the PVR. PVRs have all of the same functionality of VCRs (recording, playback, fast forwarding, rewinding, pausing, etc.) plus the ability to instantly jump to any part of the program without having to rewind or fast forward the data stream.

A PVR is also referred to as a hard disk recorder (HDR), digital video recorder (DVR), personal video station (PVS), or a personal TV receiver (PTR). An embodiment of the specific components utilized to provide the functionality of media center set-top box 102 to automatically capture user edits in a digital recording is described in more detail below with reference to FIG. 2.

Media stream 104 has several different possible input embodiments, including a television cable, a broadcast antenna, a satellite receiver, a video player, such as a tape or disk player, an audio player, such as a tape, disk or memory player, a digital device connected for example by an IEEE 1394 connection, and so forth. These inputs, after processing, selection and control (by media center set-top box 102), may be used to generate different outputs for a user. The outputs are received by display 106.

Display 106 may be a monitor, projector, a conventional analog television receiver, or any other kind of perceivable video display. The audio portion of the output may be routed through an amplifier, such as an audio/video (A/V) receiver or a sound processing engine, to headphones, speakers or any other type of sound generation device. The outputs may also be sent to an external recorder, such as a VTR, PVR, CD or DVD recorder, memory card, etc.

Media center set-top box 102 may also provide connectivity to external devices through, for example, network port 112. The user interface is provided through, for example, keyboard 108, remote control 110 or display 106. Media center set-top box 102 may communicate with other devices through its own infrared port 114. Removable storage device 116 may allow for MP3 compressed audio to be stored and played later on a portable device or for camera images to be displayed on display 106.

There are many different equipment configurations for the entertainment center using media center set-top box 102 of FIG. 1 and many different possible choices of equipment to connect. A typical home entertainment system, using typical currently available equipment, might be as follows. As inputs, this typical home entertainment system might have a television antenna and either a cable television or digital broadcast satellite (DBS) input to the tuner system of the media center set-top box. A VTR or DVD recorder might be connected as an input device and an output device. A CD player and an MP3 player might be added for music. Such a system might also include a wide screen high definition television and a surround sound receiver coupled to six or eight speakers. This same system would have a small remote control for the user and offer remote control from the media center to the television, receiver, VTR and CD player. An Internet connection and keyboard would allow for web surfing, upgrades and information downloads, while a computer network would allow for file swapping and remote control from or to a personal computer in the house.

It is to be appreciated that a lesser or more equipped entertainment system than the example described above may be preferred for certain implementations. Therefore, the configuration of the entertainment system will vary from implementation to implementation depending upon numerous factors, such as price constraints, performance requirements, technological improvements, or other circumstances. Embodiments of the invention may also be applied to other types of software-driven systems that use different hardware architectures than that shown in FIGS. 1 and 2.

Figure 2:
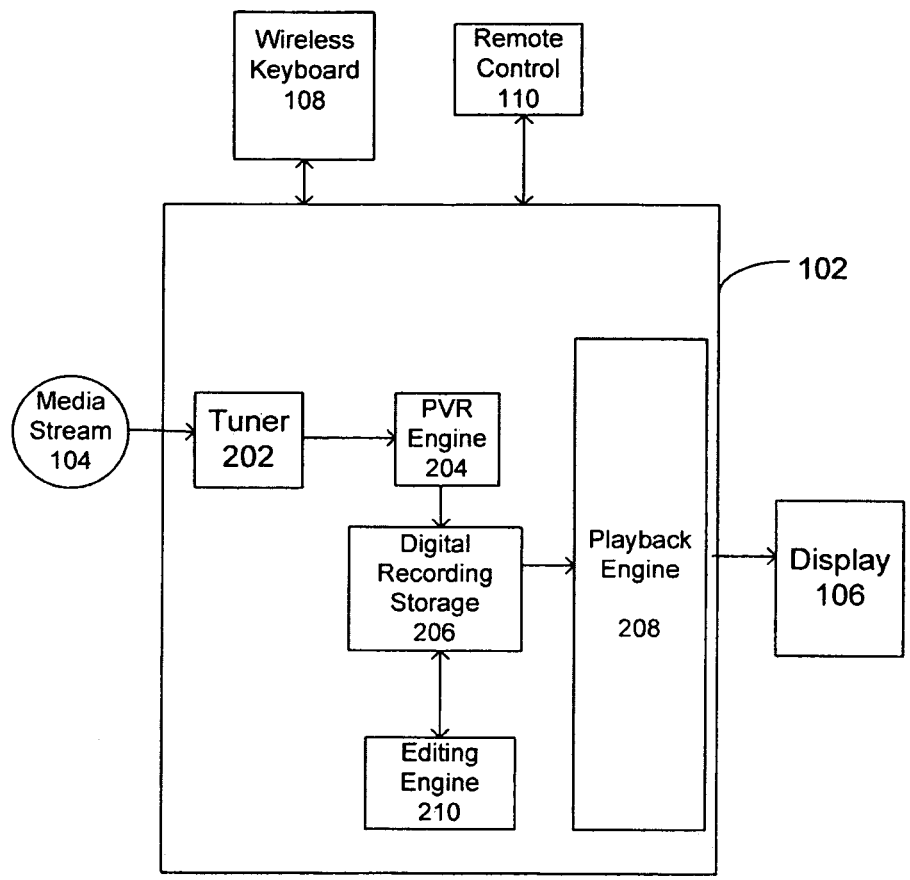
FIG. 2 illustrates one embodiment of a media center set-top box in which some embodiments of the present invention may operate.

FIG. 2 is a more detailed diagram of an embodiment of media center set-top box 102 of FIG. 1. As shown in FIG. 2, media center set-top box 102 includes, but is not necessarily limited to, a tuner 202, a PVR engine 204, digital recording storage 206, a playback engine 208 and an editing engine 210. It is important to note that the functionality of two or more of these components may be combined into one component. Each of these components is described next in more detail.

Tuner 202 can be any type of tuner capable of receiving media stream 104. Tuner 202 is assigned to PVR engine 204. In an embodiment, PVR engine 204 is an application module that coordinates activity of tuner 202 and digital recording storage 206 in order to provide PVR functionality. PVR engine 204 is responsible for trick mode functionality, such as pause, fast forward, skip forward, rewind, etc. PVR engine 204 is also responsible for recording media stream 104 (i.e., digital recordings), for managing use of hard disk space, and so forth. PVR engine 204 also is responsible for storing digital recordings in digital recording storage 206. Digital recording storage 206 is an area of memory used to store digital recordings. Playback engine 208 reads data from a digital recording stored in digital recording storage 206 and displays the data on display 106.

In an embodiment of the invention, the user may utilize either wireless keyboard 108 or remote control 110 to record time stamps via editing engine 210. These recorded time stamps are used by the invention to identify potential undesirable segments in a digital recording. As described above, a digital recording generally includes both desirable and undesirable segments. Desirable segments include the parts of the program that the user wants to view. Undesirable segments (or edit segments) include the parts of the program that the user does not want to view. Undesirable segments may include, but are not limited to, commercials, repeated recaps of the program, parts of the program the user deems unsuitable for his or her children, halftime shows of sporting events, and so forth. Embodiments of the invention automatically captures user edits while the user is viewing a digital recording. The invention then utilizes these captured user edits to identify undesirable segments in the digital recording. The present invention then allows the user to determine whether to delete or skip over the undesirable segments for subsequent viewing of the digital recording. An embodiment of a digital recording stored in digital recording storage 206 is described next with reference to FIG. 3.

Figure 3:
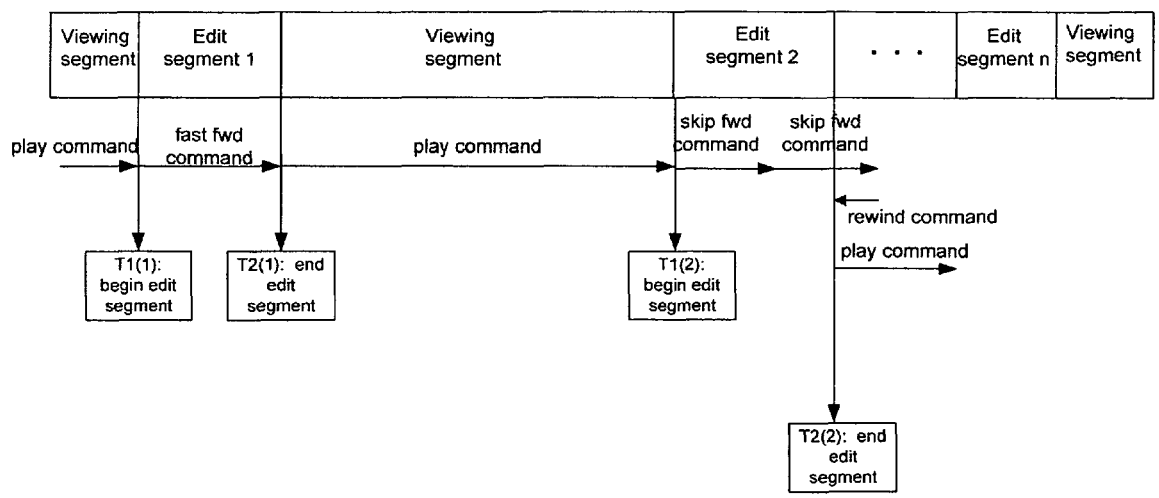
FIG. 3 illustrates one embodiment of a digital recording.

Referring to FIG. 3, a digital recording 300 is shown. Digital recording 300 is shown for illustrative purposes only and is not meant to limit the invention. Digital recording 300 is comprised of various viewing segments and n edit segments. In an embodiment of the invention, the beginning and the ending of each nth edit segment in digital recording 300 is identified via a beginning time stamp (T1($n$)) and an ending time stamp (T2($n$)). As illustrated in FIG. 3, edit segment 1 is identified via T1(1) and T2(1), edit segment 2 is identified via T1(2) and T2(2), and so forth.

In an embodiment of the invention, T1($n$) or the beginning time stamp of the nth edit segment is defined as a point in time where the user has been viewing the digital recording for some period of time and then he or she executes one of a few editing commands to move forward quickly. Two such editing commands include, but are not limited to, the fast forward command and the skip ahead (a predetermined number of seconds) command.

In an embodiment to the invention, T2($n$) or the ending time stamp of the nth edit segment is defined as a point in time after T1($n$) where the "editing" by the user ends. The end of editing is indicated by the user executing the play button (after the fast forward or skip ahead command), or no more skipping ahead or no more rewinding or no more skipping back for a certain period of minutes.

As illustrated in FIG. 3 for edit segment 1, time stamp T1(1) is the point in time when the user presses the fast forward command and the time stamp T2(1) is the point in time when the user presses the play command. Regarding edit segment 2, time stamp T1(2) is the point in time when the user presses the skip forward command and the time stamp T2(2) is the point in time when the user presses the play command (after the user presses the skip ahead command twice and presses the rewind command once). Embodiments of the operation of the present invention are described next in more detail with reference to the flow diagram of FIG. 4.

Figure 4:
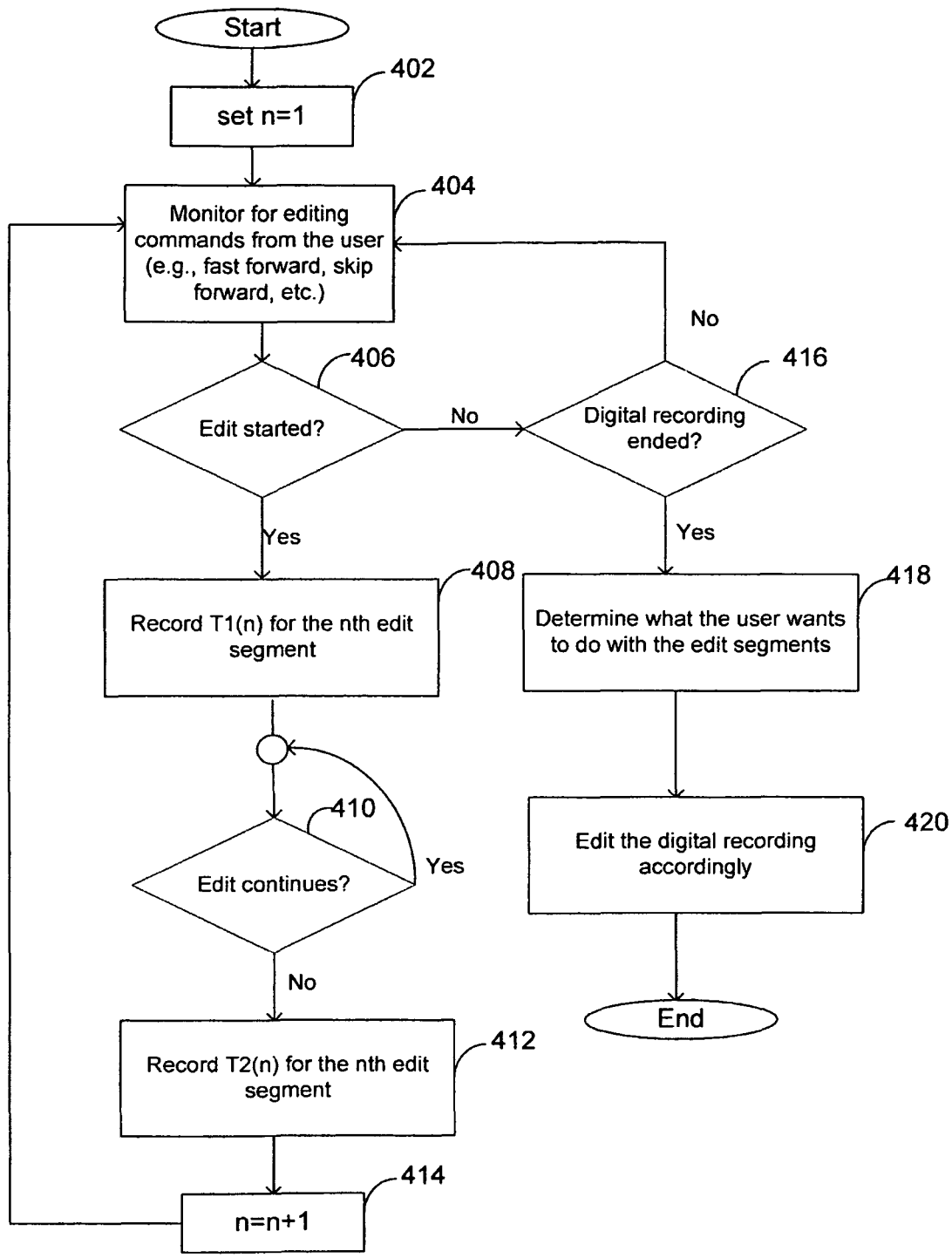
FIG. 4 is a flow diagram of one embodiment of a process for capturing automatic edits in a digital recording.

FIG. 4 is a flow diagram of one embodiment of a process for automatically capturing user edits in a digital recording. Referring to FIG. 4, the process begins at processing block 402 where n is set to 1. In processing block 404, the user has been viewing the digital recording and the invention is monitoring for editing commands (e.g., fast forward command, skip forward command, etc.).

At decision block 406, it is determined whether editing has started. As described above, T1($n$) or the beginning time stamp of the nth edit segment is defined as a point in time where the user has been viewing the digital recording for some period of time and then he or she executes one of a few editing commands to move forward quickly. Two such editing commands include, but are not limited to, the fast forward command and the skip ahead (a predetermined number of seconds) command. If it is determined that editing has started at decision block 406, then the process continues at processing block 408.

At processing block 408, T1($n$) is recorded for the nth edit segment. In an embodiment of the invention, T1($n$) is recorded as the point in time in which the editing command started. At decision block 410, it is determined whether editing continues. In an embodiment of the invention, whether editing continues is determined by edit keys depressed and the timing of the edits (e.g., frequency and active state). If so, then the process waits until editing ends and then the process continues at processing block 412.

At processing block 412, T2($n$) is recorded for the nth edit segment. In an embodiment of the invention, T2($n$) is the point in time after T1($n$) where the "editing" by the user ends. The end of editing is indicated by the user executing the play button (after the fast forward or skip ahead command), or no more skipping ahead or no more rewinding or no more skipping back for a certain period of time (e.g., minutes).

At processing block 414, n is incremented by one and processing continues back at processing block 404, where the invention monitors for the next editing command from the user.

Back at decision block 406, if it is determined that editing has not started, it may be the case that the digital recording has ended. At decision block 416, if the digital recording has not ended then processing continues back at processing block 404. Alternatively, if the digital recording has ended, then processing continues at processing block 418.

At processing block 418, it is determined whether the user wants to modify the edit segments in the digital recording. In an embodiment of the invention, the user is presented with a recap of each of the edit segments and given several options regarding each edit segment in subsequent viewings of the digital recording. The options include, but are not limited to, not amending the edit segment, have editing engine 210 use the time stamps for the edit segment to automatically skip over the edit segment (e.g., brief pause during subsequent viewings), and have editing engine 210 remove the edit segment and re-splice the digital recording (e.g., edit segment is eliminated in subsequent viewings). This can be done as a background task. Removing the edit segments has the added benefit of efficient utilization of digital recording storage 206.

At processing block 420, editing engine 210 edits the digital recording according to the user feedback in processing step 418. The process of FIG. 4 ends at this point.

In an embodiment of the invention, each time the invention captures either a beginning time stamp T1(*n*) or an ending time stamp T2(*n*) the invention displays some indication of such on display 106. At this time, the user may on-the-fly (e.g., during the viewing and editing process) decide to keep the time stamp or delete the time stamp.

A method and system for automatically capturing user edits in a digital recording have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
    determining a beginning time stamp for an edit segment in a digital recording that is responsive to a play command and an editing command when executed, wherein the beginning time stamp is determined as a point in time in which the editing command is initially executed;
    determining an ending time stamp for the edit segment in the digital recording, wherein the ending time stamp is determined as a point in time after the beginning time stamp when the user sends an indication to stop editing, wherein the indication to stop editing includes not executing the editing command again for a period of time after the editing command was initially executed; and
    receiving an indication from a user whether to modify the edit segment for subsequent viewing of the digital recording based on the beginning and ending time stamps.

2. The method of claim 1, further comprising:
    modifying the edit segment in the digital recording according to the received indication from the user.

3. The method of claim 2, wherein modifying the edit segment includes skipping over the edit segment in a subsequent viewing of the digital recording.

4. The method of claim 2, wherein modifying the edit segment includes removing the edit segment from the digital recording.

5. The method of claim 1, wherein the editing command is a fast forward command.

6. The method of claim 1, wherein the editing command is a skip ahead command.

7. The method of claim 1, wherein the indication to stop editing further includes executing a play command.

8. The method of claim 1, wherein receiving the indication from the user includes an on-the-fly indication of whether to keep or delete the beginning time stamp.

9. The method of claim 1, wherein receiving the indication from the user includes an on-the-fly indication of whether to keep or delete the ending time stamp.

10. A system comprising:
    an editing engine to:
        determine a beginning time stamp for an edit segment in a digital recording that is responsive to a play command and an editing command when executed, wherein the beginning time stamp is determined as a point in time in which editing command is initially executed;
        determine an ending time stamp for the edit segment, wherein the ending time stamp is determined as a point in time after the beginning time stamp when the user sends an indication to stop editing, wherein the indication to stop editing includes not executing the editing command again for a period of time after the editing command was initially executed; and
        receive an indication from a user whether to modify the edit segment for subsequent viewing of the digital recording based on the beginning and ending time stamps.

11. The system of claim 10, wherein the editing engine modifies the edit segment in the digital recording according to the received indication from the user.

12. The system of claim 10, wherein the editing engine modifies the edit segment by skipping over the edit segment in a subsequent viewing of the digital recording.

13. The system of claim 10, wherein the editing engine modifies the edit segment by removing the edit segment from the digital recording.

14. The system of claim 10, wherein the editing command is a fast forward command.

15. The system of claim 10, wherein the editing command is a skip ahead command.

16. The system of claim 10, wherein the indication to stop editing further includes executing a play command.

17. The system of claim 10, wherein the indication from the user includes an on-the-fly indication of whether to keep or delete the beginning time stamp.

18. The system of claim 10, wherein the indication from the user includes an on-the-fly indication of whether to keep or delete the ending time stamp.

19. A non-transitory machine-readable medium storing a computer program which, when executed by a processing system, cause the processing system to perform a method, the method comprising:
    determining a beginning time stamp for an edit segment in a digital recording that is responsive to a play command and an editing command when executed, wherein the beginning time stamp is determined as a point in time in which the editing command is initially executed;
    determining an ending time stamp for the edit segment in the digital recording, wherein the ending time stamp is determined as a point in time after the beginning time stamp when the user sends an indication to stop editing, wherein the indication to stop editing includes not executing the editing command again for a period of time after the editing command was initially executed; and
    receiving an indication from a user whether to modify the edit segment for subsequent viewing of the digital recording based on the beginning and ending time stamps.

20. The machine-readable medium of claim 19, further comprising:
    modifying the edit segment in the digital recording according to the received indication from the user.

* * * * *